(12) United States Patent
Sharma et al.

(10) Patent No.: US 10,992,474 B2
(45) Date of Patent: Apr. 27, 2021

(54) PROACTIVE USER AUTHENTICATION FOR FACILITATING SUBSEQUENT RESOURCE ACCESS ACROSS MULTIPLE DEVICES

(71) Applicant: EMC IP Holding Company LLC, Hopkinton, MA (US)

(72) Inventors: Nagendra Gudibande Srikanta Sharma, Bangalore (IN); Udayendranaidu Gottapu, Visakhapatnam (IN); Pedda Peddy Kathriki, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 305 days.

(21) Appl. No.: 16/174,632

(22) Filed: Oct. 30, 2018

(65) Prior Publication Data

US 2020/0136826 A1 Apr. 30, 2020

(51) Int. Cl.
*H04L 9/32* (2006.01)
*H04L 29/06* (2006.01)

(52) U.S. Cl.
CPC ........ *H04L 9/3218* (2013.01); *H04L 63/0876* (2013.01); *H04L 63/102* (2013.01)

(58) Field of Classification Search
CPC .. H04L 9/3218; H04L 63/0876; H04L 63/102
USPC ...................................................... 713/155
See application file for complete search history.

(56) References Cited

U.S. PATENT DOCUMENTS

| 7,657,639 B2 * | 2/2010 | Hinton | H04L 63/0815 |
| | | | 709/229 |
| 8,505,076 B2 | 8/2013 | Das et al. | |
| 9,292,671 B1 | 3/2016 | Robinson et al. | |
| 10,050,787 B1 * | 8/2018 | Johansson | G06F 21/57 |

(Continued)

OTHER PUBLICATIONS

Sciancalepore et al., "OAuth-IoT: an access control framework for the Internet of Things based on open standards", 2017 IEEE Symposium on Computers and Communications (ISCC), pp. 1-6 (Year: 2017).*

(Continued)

*Primary Examiner* — Khalil Naghdali
(74) *Attorney, Agent, or Firm* — Ryan, Mason & Lewis, LLP (57) ABSTRACT

Methods, apparatus, and processor-readable storage media for proactive user authentication for facilitating subsequent resource access across multiple devices are provided herein. An example computer-implemented method includes validating an authentication result received via a first user device; generating, in response to validating the authentication result, a proof of authentication that relates to the authentication performed via the first user device; outputting the proof of authentication to the first user device; receiving, via a second user device in connection with a request to access a protected resource, cryptographic information comprising at least a portion of the proof of authentication output to the first user device; validating the cryptographic information received via the second user device against the proof of authentication; and granting, to the second user device, access to the protected resource in response to validating the cryptographic information against the proof of authentication.

20 Claims, 5 Drawing Sheets

(56) References Cited

U.S. PATENT DOCUMENTS

| | | | |
|---|---|---|---|
| 10,057,255 B2* | 8/2018 | Votaw | H04L 63/0838 |
| 2016/0127339 A1* | 5/2016 | Childs | G06F 16/148 |
| | | | 726/7 |
| 2018/0198792 A1 | 7/2018 | Shah et al. | |
| 2018/0270226 A1* | 9/2018 | Agrawal | H04W 76/10 |
| 2019/0305964 A1* | 10/2019 | Hamel | H04L 9/3218 |

OTHER PUBLICATIONS

Faynberg et al., "On Dynamic Access Control in Web 2.0 and Beyond: Trends and Technologies", Bell Labs Technical Journal 16(2), 199-218 (2011) © 2011 Alcatel-Lucent. • DOI: 10.1002/bltj. 20511, pp. 199-218 (Year: 2011).*

Adireddy et al., "Usercentric Federation of Access to Internet-of-Things(IoT) Devices", IEEE conferences Oct. 1, 2016, International Conference on Circuits, Control, Communications and Computing (I4C), pp. 1-7 (Year: 2016).*

* cited by examiner

PROACTIVE USER AUTHENTICATION FOR FACILITATING SUBSEQUENT RESOURCE ACCESS ACROSS MULTIPLE DEVICES

FIELD

The field relates generally to information processing systems, and more particularly to techniques for providing security in such systems.

BACKGROUND

In order to gain access to applications or other resources via a computer or another user device, users are often required to authenticate themselves by entering authentication information. Such authentication information may include, for example, passwords, responses to one or more challenge questions, or other forms of cryptographic or authentication information.

In one common scenario, a user may request access to a protected resource from a first device and be prompted to authenticate on a second device. For example, a user may request access to a resource from a first device such as a laptop, and the user is subsequently required to respond to an authentication request on a second device such as a smart phone. Challenges can arise in such a scenario if there are connectivity issues (such as availability, security policies, etc.), network lags, and/or other delays in the authentication flow with respect to the second device. For instance, in certain contexts, the user's second device (e.g., a smart phone) may not be able to connect to the relevant network in order to carry out the authentication, thereby precluding the user from accessing the protected resource from his or her first device (e.g., a laptop).

SUMMARY

Illustrative embodiments of the invention provide techniques for proactive user authentication for facilitating subsequent resource access across multiple devices. An exemplary computer-implemented method can include validating an authentication result received via a first user device, generating, in response to validating the authentication result, a proof of authentication that relates to the authentication performed via the first user device, and outputting the proof of authentication to the first user device. Such a method can also include receiving, via a second user device in connection with a request to access a protected resource, cryptographic information comprising at least a portion of the proof of authentication output to the first user device. Further, such a method can additionally include validating the cryptographic information received via the second user device against the proof of authentication, and granting, to the second user device, access to the protected resource in response to validating the cryptographic information against the proof of authentication.

Illustrative embodiments can provide significant advantages relative to conventional multi-device authentication arrangements. For example, challenges associated with connectivity issues of one or more of the devices are overcome through the use of a proof of authentication that corresponds to a previously-performed authentication via at least one of the devices. Such a proof of authentication mechanism allows a user to subsequently carry out the multi-device authentication protocol even when first device is subsequently disconnected from a relevant network.

These and other illustrative embodiments described herein include, without limitation, methods, apparatus, systems, and computer program products comprising processor-readable storage media.

DETAILED DESCRIPTION

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
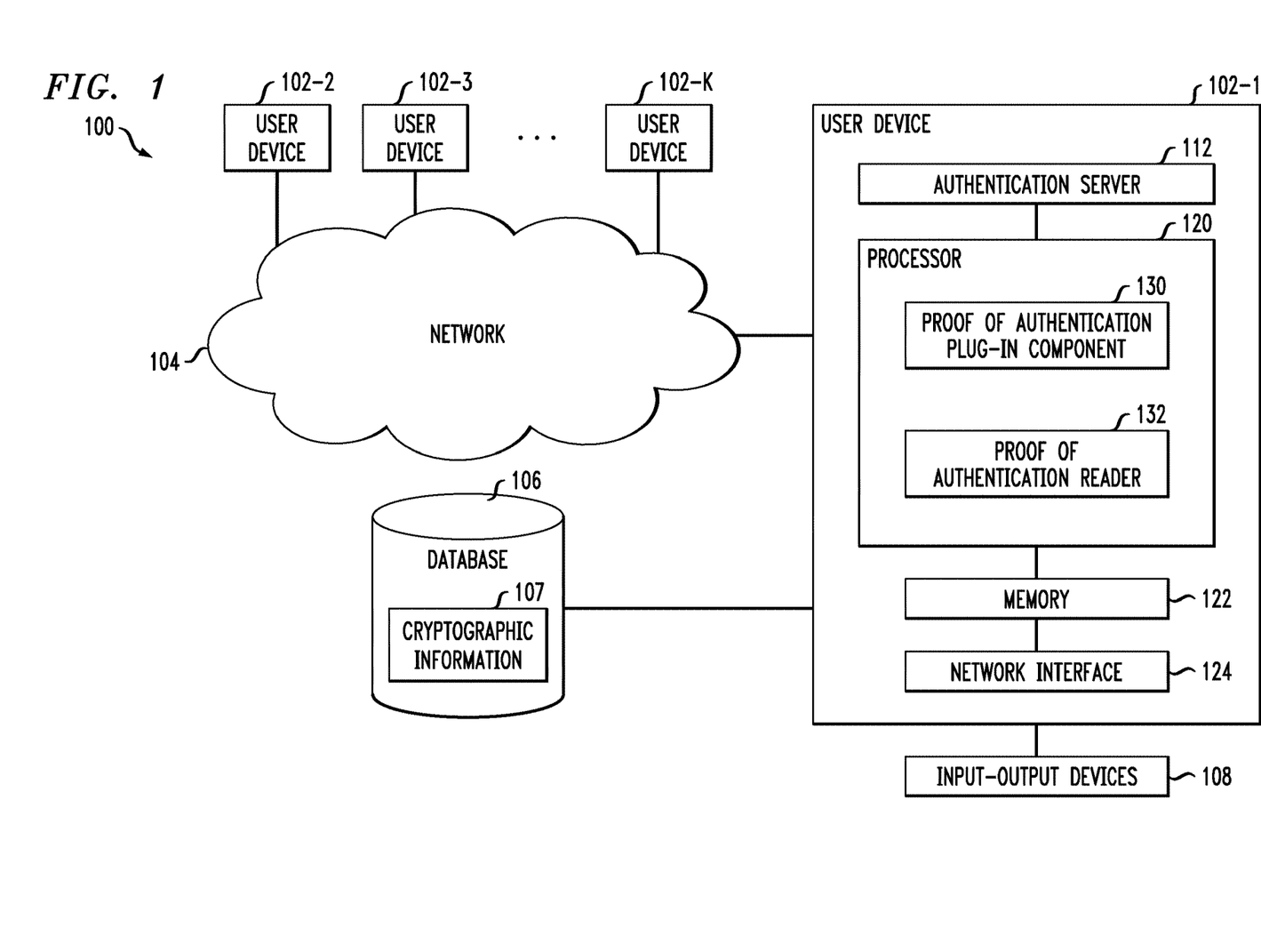
FIG. 1 shows an information processing system configured for proactive user authentication for facilitating subsequent resource access across multiple devices in an illustrative embodiment of the invention.

FIG. 1 shows a computer network (also referred to herein as an information processing system) 100 configured in accordance with an illustrative embodiment of the invention. The computer network 100 comprises a plurality of user devices 102-1, 102-2, 102-3, . . . 102-K, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment.

The user devices 102 may comprise, for example, mobile telephones, laptop computers, tablet computers, desktop computers or other types of devices capable of supporting user logins, in any combination. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, one or more of the user devices 102 can have an associated database 106 configured to store cryptographic information data 107, which can include proofs of authentication generated in connection with one or more proactive authentication processes, as well as other types of login data including timestamps and other information associated with login events.

The database 106 in the present embodiment is implemented using one or more storage systems associated with user devices 102. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with one or more of the user devices 102 are input-output devices 108, which illustratively comprise keyboards, displays or other types of input-output devices in any combination. Such input-output devices can be used, for example, to support one or more user interfaces to user devices 102, as well as to support communication between user devices 102 and other related systems and devices not explicitly shown.

Figure 2:
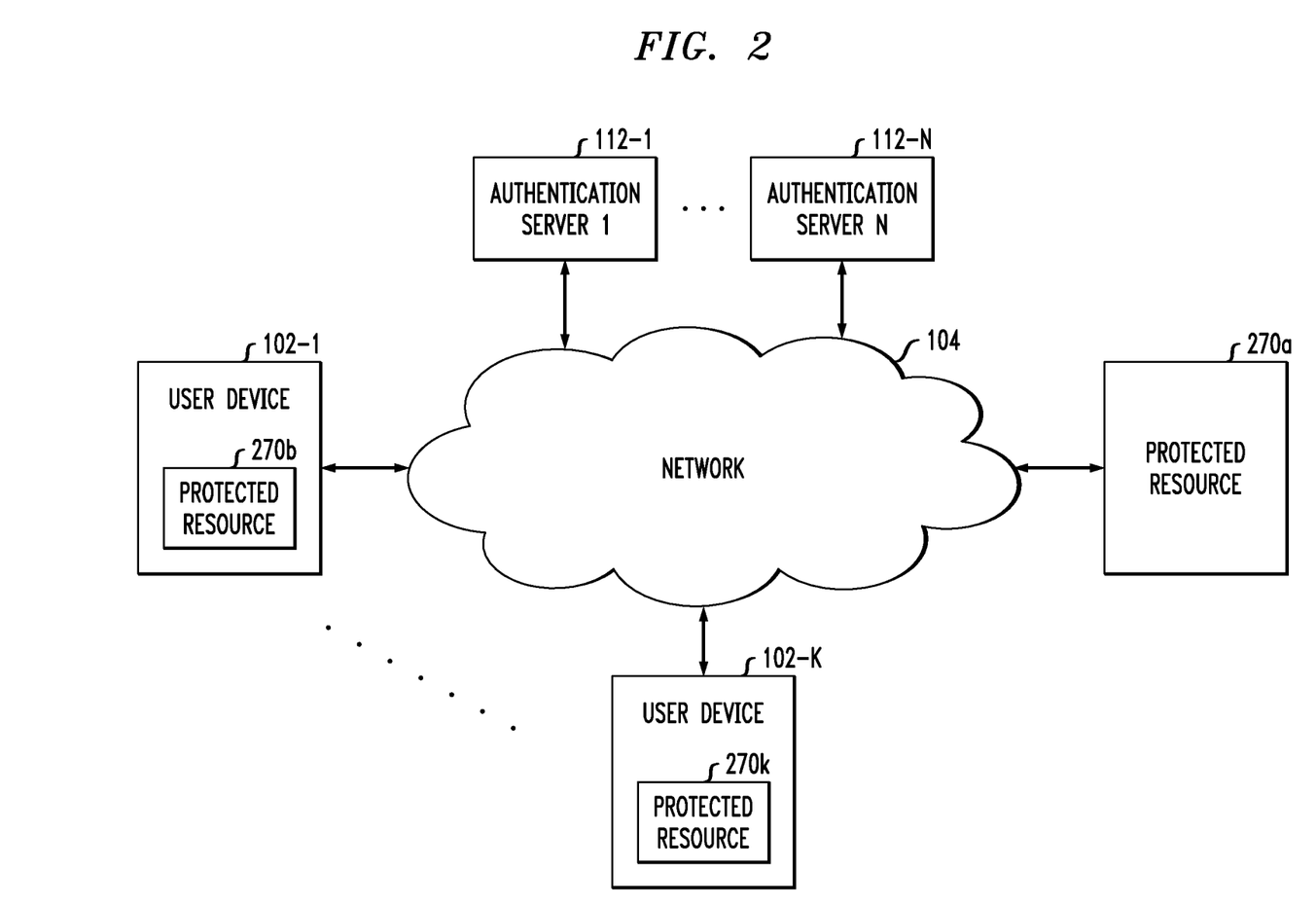
FIG. 2 shows another information processing system configured for proactive user authentication for facilitating subsequent resource access across multiple devices in an illustrative embodiment of the invention.

As also depicted in the example embodiment of the invention detailed in FIG. 1, user devices 102 comprise an authentication server 112. Login events initiated at respective ones of the user devices 102 are directed to the authentication server 112 over the network 104 for processing. The authentication server 112 determines if a given access attempt is authentic based on presentation of one or more predetermined authentication factors such as user identifiers, passwords or other factors. Upon verification of the presented authentication factors, the authentication server 112 can grant the requesting user device 102 access to one or more protected resources of the computer network 100, and/or the user device can be provided a proof of authentication for use in one or more subsequent authentication requests. Although shown as an element of the user devices 102 in this embodiment, the authentication server 112 in other embodiments can be implemented at least in part externally to the user device 102, for example, as a stand-alone server, set of servers or other type of authentication system coupled to the network 104 (such as depicted in FIG. 2, for example).

Each user device 102 in the FIG. 1 embodiment is assumed to be implemented using at least one processing device. Each such processing device generally comprises at least one processor and an associated memory, and implements one or more functional modules for controlling certain features of the user device 102.

More particularly, user devices 102 in this embodiment each can comprise a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

One or more embodiments of the invention include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the user devices 102 to communicate over the network 104 with the user devices 102, and illustratively comprises one or more conventional transceivers.

The processor 120 further comprises a proof of authentication plug-in component 130 and a proof of authentication reader 132.

It is to be appreciated that this particular arrangement of modules 130 and 132 illustrated in the processor 120 of the FIG. 1 embodiment is presented by way of example only, and alternative arrangements can be used in other embodiments. For example, the functionality associated with the modules 130 and 132 in other embodiments can be combined into a single module, or separated across a larger number of modules. As another example, multiple distinct processors can be used to implement different ones of the modules 130 and 132 or portions thereof.

At least portions of the proof of authentication plug-in component 130 and proof of authentication reader 132 may be implemented at least in part in the form of software that is stored in memory 122 and executed by processor 120. Similarly, at least portions of the authentication server 112 of user devices 102 can be implemented at least in part in the form of software that is stored in memory 122 and executed by processor 120.

It is to be understood that the particular set of elements shown in FIG. 1 for proactive authentication involving user devices 102 of computer network 100 is presented by way of illustrative example only, and in other embodiments additional or alternative elements may be used. Thus, another embodiment may include additional or alternative systems, devices and other network entities, as well as different arrangements of modules and other components.

An exemplary process utilizing proof of authentication plug-in component 130 and proof of authentication reader 132 of an example user device 102 in computer network 100 will be described in more detail with reference to the flow diagram of FIG. 4.

FIG. 2 is a system diagram of an illustrative embodiment of the invention. By way of illustration, FIG. 2 depicts an alternative embodiment to FIG. 1, wherein the authentication server(s) 112 is/are not resident on the user device(s) 102, but rather are separate devices. Accordingly, as depicted in FIG. 2, user device 102 communicates with a protected resource 270a over network 104. As detailed further below, at least one embodiment of the invention can also include a user device 102 that includes a protected resource 270b residing thereon. In an example implementation, a user authenticates online with one or more authentication servers 112-1 through 112-N (hereinafter, collectively referred to as authentication servers 112) before obtaining access to protected resource 270a, 270b, . . . 270k (hereinafter, collectively referred to as protected resource 270 unless otherwise specified).

According to one aspect of the invention, as noted above, the user of the user device 102 is authenticated by authentication servers 112 using a password, challenge questions, and/or other forms of cryptographic information. The exemplary communications among the system elements 102, 104 and 270 of FIG. 2 to achieve authentication by the authentication servers 112 are discussed further below.

It is to be appreciated that a given embodiment of the disclosed system may include multiple instances of user device 102 and protected resource 270, and possibly other system components, although only single instances of such components are shown in the simplified system diagram of FIG. 2 for clarity of illustration.

As noted herein, user device 102 may represent a portable device, such as a mobile telephone, personal digital assistant (PDA), wireless email device, game console, etc. The user device 102 may alternatively represent a desktop or laptop personal computer (PC), a microcomputer, a workstation, a mainframe computer, a wired telephone, a television set top box, or any other information processing device which can benefit from the use of authentication techniques in accordance with the invention.

The user device 102 may also be referred to herein as simply a "user." The term "user," as used in this context, should be understood to encompass, by way of example and without limitation, a user device, a person utilizing or otherwise associated with the device, or a combination of both. An operation described herein as being performed by a user may therefore, for example, be performed by a user device, a person utilizing or otherwise associated with the device, or by a combination of both the person and the device. Similarly, a password, challenge question, or other cryptographic information described as being associated with a user may, for example, be associated with a user device 102, a person utilizing or otherwise associated with the device, or a combination of both the person and the device.

As also depicted in FIG. 2, the authentication servers 112 can be associated with a third party entity, such as an authentication authority, that processes authentication requests on behalf of web servers and other resources, as well as verifies the cryptographic information that is presented by a user device 102.

Further, the protected resource 270 may be, for example, an access-controlled application, web site or hardware device. In other words, a protected resource 270 is a resource that grants user access responsive to an authentication process, as will be described in greater detail below. For example, protected resource 270a may include an access controlled file, e-mail, a protected application, a remote application server such as a web site or other software program or hardware device that is accessed by the user device 102 over a network 104.

Additionally, in at least one embodiment of the invention, protected resource 270b can include one or more applications or data residing on the user device 102 itself. For example, such a protected resource 270b can include access to a mobile data management container for launching applications on the user device 102 (such as a mobile device), which can be protected requiring authentication in order to run the application(s) protected by the container. Further, protected resource 270b could also include an access controlled file, e-mail, a protected application, a remote application server such as a web site or other software program or hardware device that is accessed by the user device 102 over network 104. Similarly, it is possible that in order to unlock the mobile platform to perform operations, a successful authentication might be required.

Figure 3:
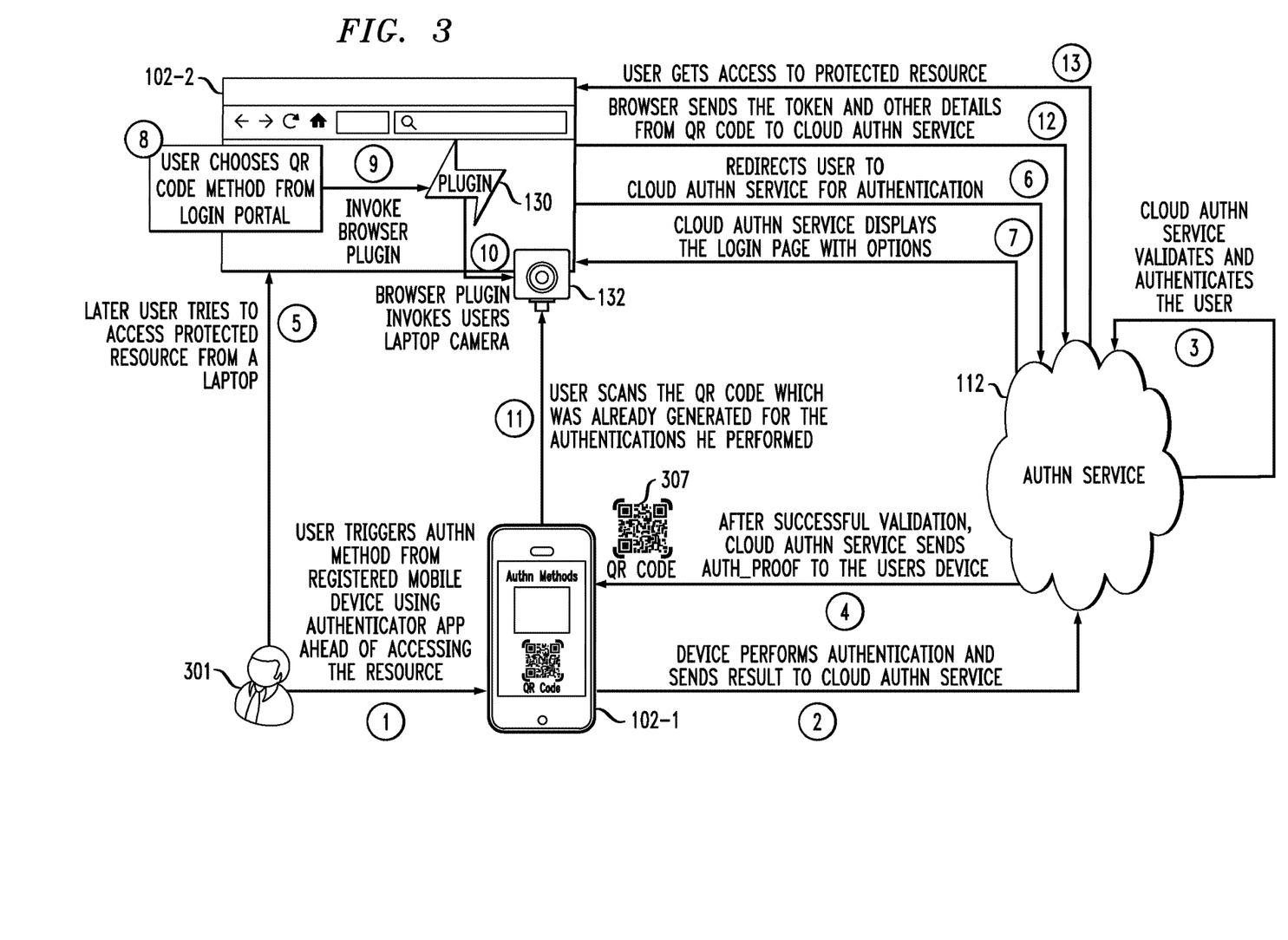
FIG. 3 shows an example workflow in an illustrative embodiment of the invention.

FIG. 3 shows an example workflow in an illustrative embodiment of the invention. By way of illustration, FIG. 3 depicts an example workflow of a user 301 proactively completing authentication on his or her mobile device 102-1 to obtain a proof of authentication 307 from an authentication service 112, and using the proof of authentication 307 to access resources later (even if the device 102-1 is offline at the time of access).

Specifically, assume that the user 301 uses his or her registered mobile device 102-1 to perform authentication to a protected application and/or resource which is configured to trigger a biometric input as a step-up, and wherein the requested application/resource access is to occur on the user's laptop 102-2. Accordingly, as illustrated in FIG. 3, in Step 1, the user initiates an authentication method (for example, FaceID, EyePrintID, etc.) from his or her registered mobile device 102-1 using an authenticator application (downloaded on the mobile device 102-1) ahead of accessing the resource (on a second device such as the user's laptop 102-2). By way of example, the user 301 may attempt to perform this authentication when the user is entering the office premises, during a laptop boot-up or restart, while/ where there is network connectivity for the device 102-1. In Step 2, the registered mobile device 102-1 sends the authentication method result to cloud authentication service 112, and in Step 3, the cloud authentication service 112 validates the user 301 and the device 102-1.

After successful validation and creation of an authentication session for the user 301 and the device 102-1, the cloud authentication service 112, in Step 4, sends a proof of authentication (AUTH_PROOF) 307 (which can include, for example, a QR code) to the user's registered device 102-1 for the authentication methods performed. In one or more embodiments of the invention, the AUTH_PROOF 307 contains session information as well as one or more other details, and is bound by a temporal parameter beyond which the proof of authentication 307 cannot be reused. Additionally, the AUTH_PROOF 307 is stored on the user's registered device 102-1 within the authenticate application. In order for the user 301 to retrieve the stored proof of authentication 307, the user 301 is required to complete a form of authentication (for example, biometric authentication) locally on the mobile device 102-1. Without performing such an authentication, the user 301 will not be able to retrieve and use the AUTH_PROOF 307.

Subsequently, in Step 5, when the user 301 is using his or her laptop 102-2, the user 301 attempts to access a protected resource. In Step 6, the resource redirects the user 301 to the cloud authentication service 112 for authentication, and in Step 7, the cloud authentication service 112 prompts the user 301, by displaying a login page with authentication options on the user's laptop 102-2. Among the authentication options displayed is an option which takes as input the proof of authentication (that was sent to user's mobile device 102-1 as part of Step 4 above). As used in connection with this FIG. 3 example embodiment, this new authentication method/type can be referred to as PRE AUTH_QR_CODE.

In Step 8, the user 301 selects the PRE AUTH_QR_CODE method from the login page, which, in Step 9, invokes browser plug-in component 130, which invokes, in Step 10, a proof of authentication reader (AUTH_PROOF_READER) 132 that is capable of scanning QR codes. In one or more embodiments of the invention, the browser plug-in component 130 uses the user's laptop camera and prompts the user to show the proof of authentication (AUTH_PROOF) 307 as a QR code. The user 301 can also open the authenticate application on his or her mobile device 102-1 and attempt to retrieve the AUTH_PROOF data 307. In one or more embodiments of the invention, the user is prompted, on the mobile device 102-1, to perform an authentication operation locally via the mobile device 102-1 (for example, a biometric authentication) in order to view the AUTH_PROOF data 307. Assume, in this example embodiment, that the user 301 successfully completes this locally-initiated authentication to present the AUTH_PROOF data 307 as a QR code on the mobile device 102-1.

In Step 11, the reader 132 then scans the AUTH_PROOF (QR code) 307 that is displayed on the user's mobile device 102-1, which was previously generated from the proof of the authentication that the user 301 received from the cloud authentication service 112 in Step 4. In one or more embodiments of the invention, the proof of authentication (AUTH_PROOF) transmission from the registered mobile device 102-1 to the AUTH_PROOF_READER 132 can be carried out through any proximity-based communication channel.

In Step 12, the browser (via the laptop 102-2) then sends the token (for example, the scanned QR code) and other details from AUTH_PROOF (QR code) 307 to the cloud authentication service 112. The cloud authentication service 112 will validate the QR code AUTH_PROOF (QR code) 307 against the proof of authentication it has stored (which is the same data that the cloud authentication service 112 previously sent to the user's mobile device 102-1 in Step 4). If the AUTH_PROOF (QR code) 307 is validated by the cloud authentication service 112, the user 301 will be provided access, in Step 13, to the resource on the user's laptop 102-2.

Accordingly, as illustrated in the example embodiment of FIG. 3, the user 301 was able to access a protected resource that required step-up authentication and which needs connectivity to the cloud authentication service 112 to complete, even when his or her mobile device 102-1 may not have been connected to the cloud authentication service 112 (that is, offline). Additionally, at least one embodiment of the invention can be extended to one or more applications using various authentication and single sign-on (SSO) protocols.

Figure 4:
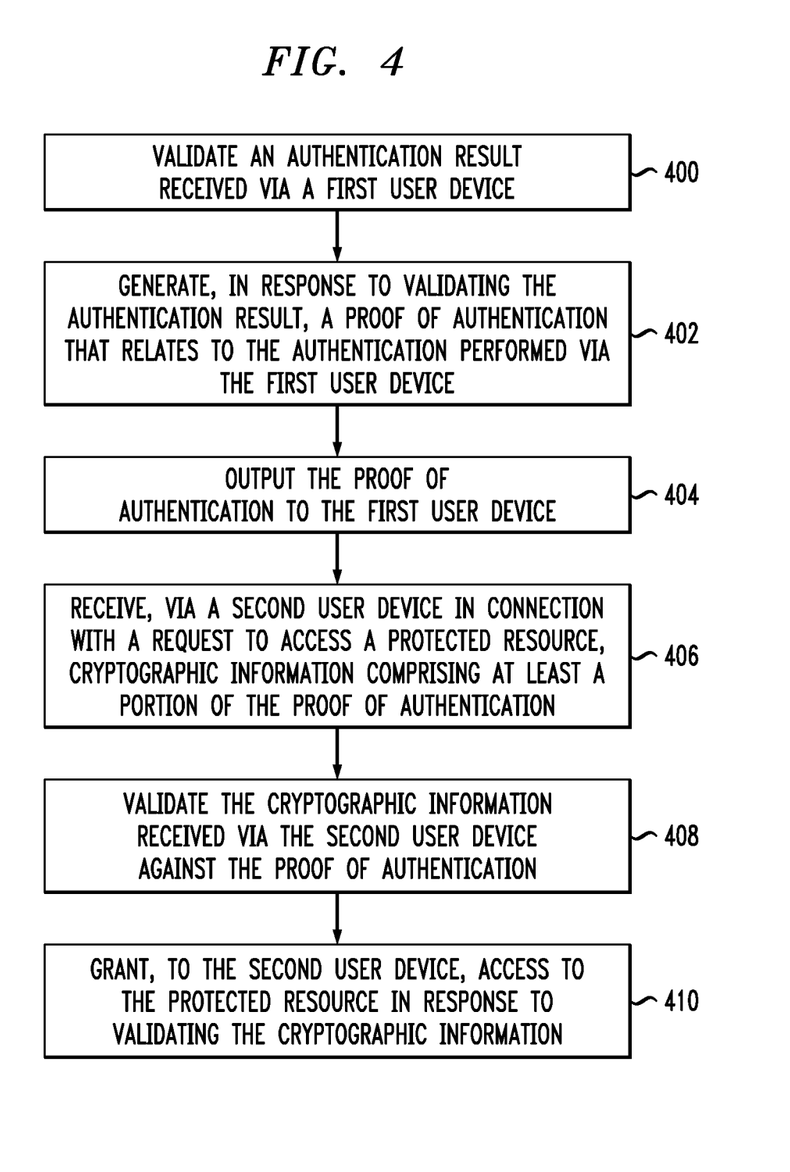
FIG. 4 is a flow diagram of a process for proactive user authentication for facilitating subsequent resource access across multiple devices in an illustrative embodiment.

FIG. 4 is a flow diagram of a process for proactive user authentication for facilitating subsequent resource access across multiple devices in an illustrative embodiment. It is to be understood that this particular process is only an example, and additional or alternative processes can be carried out in other embodiments.

In this embodiment, the process includes steps 400 through 410. Step 400 includes validating an authentication result received via a first user device. Additionally, at least one embodiment of the invention can include creating, in response to validating the authentication result received via the first user device, an authentication session for the user.

Step 402 includes generating, in response to validating the authentication result, a proof of authentication that relates to the authentication performed via the first user device. The proof of authentication can include, for example, a quick response code, a set of alphanumeric data, a set of image data, a set of audio data, and/or a set of video data. Additionally, the proof of authentication can include one or more temporal parameters, wherein such temporal parameters can, for example, define a duration of time during which the proof of authentication remains valid. Further, in at least one embodiment of the invention, the proof of authentication can include information pertaining to a corresponding authentication session.

Step 404 includes outputting the proof of authentication to the first user device. Also, at least one embodiment of the invention includes storing the proof of authentication.

Step 406 includes receiving, via a second user device in connection with a request to access a protected resource, cryptographic information comprising at least a portion of the proof of authentication output to the first user device. Additionally, at least one embodiment of the invention includes prompting, in response to receiving the request to access the protected resource from the second user device, the second user device to retrieve the proof of authentication from the first user device.

Step 408 includes validating the cryptographic information received via the second user device against the proof of authentication. Step 410 includes granting, to the second user device, access to the protected resource in response to validating the cryptographic information against the proof of authentication.

Also, in accordance with one or more embodiments of the invention, the first user device and/or the second user device can include, for example, a desktop computer, a laptop computer, a tablet, a mobile device, etc.

Accordingly, the particular processing operations and other functionality described in conjunction with the flow diagram of FIG. 4 are presented by way of illustrative example only, and should not be construed as limiting the scope of the invention in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to proactively authenticate a user and utilize the proof of that proactive authentication in one or more subsequent attempts (via a user-registered mobile device that can be online or offline) to access protected resources. These and other embodiments can effectively reduce wait time as well as enable offline access to resources.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems such as Amazon Web Services (AWS), Google Cloud Platform (GCP) and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
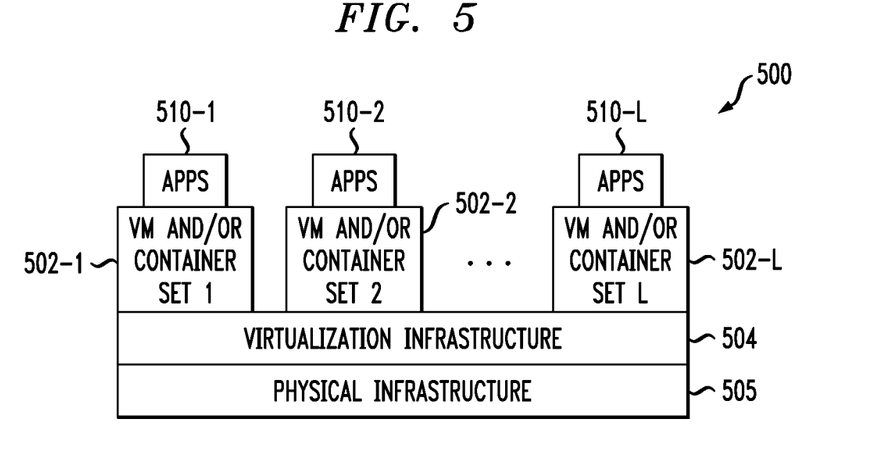
FIGS. 5 and 6 show examples of processing platforms that may be utilized to implement at least a portion of an information processing system in illustrative embodiments.
Figure 6:
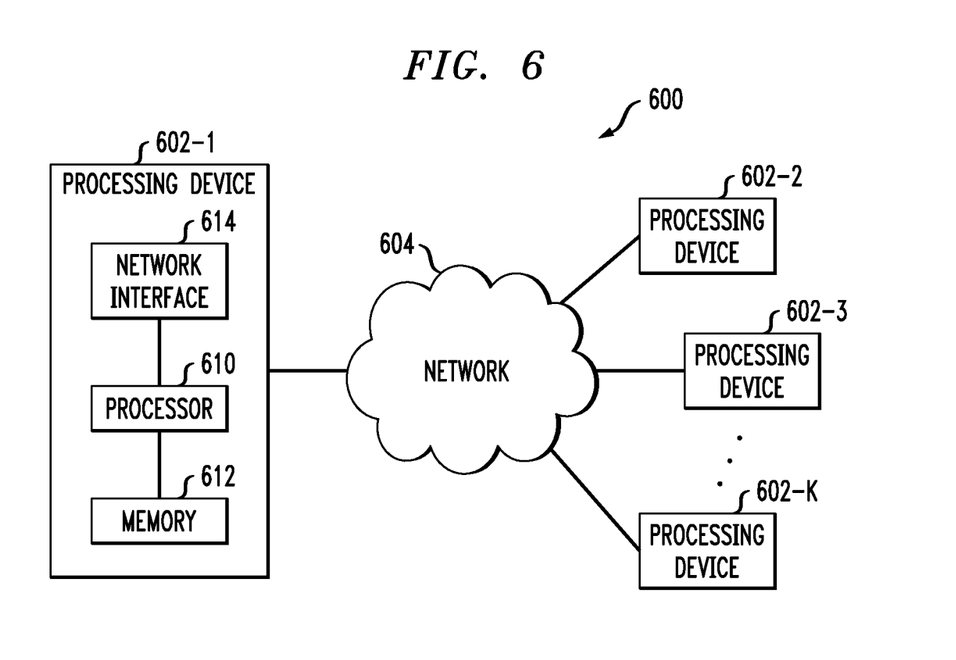

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide deduplication estimate generation functionality of the type described above for one or more processes running on a given one of the VMs. For example, each of the VMs can implement deduplication control logic and associated deduplication estimate tables for providing deduplication estimate generation functionality for one or more processes running on that particular VM.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA) or other type of processing circuitry, as well as portions or combinations of such circuitry elements.

The memory 612 may comprise random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include VNX® and Symmetrix VMAX® storage arrays, software-defined storage products such as ScaleIO™ and ViPR, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. For example, the disclosed techniques are applicable to a wide variety of other types of information processing systems in which it is desirable to provide secure authentication capabilities even in situations when one or more devices are offline for at least a portion of the authentication process. Also, the particular configurations of system and device elements and associated processing operations illustratively shown in the drawings can be varied in other embodiments. Thus, for example, the particular types of processing platforms, modules, cloud-based systems and virtual resources deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A computer-implemented method comprising:
validating, via at least one authentication service connected to a first user device via network connectivity, an authentication result received via the first user device;
generating, via the at least one authentication service in response to validating the authentication result, a proof of authentication that relates to the authentication performed via the first user device;
outputting, via the at least one authentication service, the proof of authentication to the first user device via the network connectivity;
outputting, via the at least one authentication service to a second user device via network connectivity, a request for cryptographic information in response to a request to access a protected resource by the second user device;
obtaining, via the second user device from the first user device, wherein the first user device lacks network connectivity, at least a portion of the proof of authentication;
receiving, via the at least one authentication service from the second user device via network connectivity, cryptographic information comprising the at least a portion of the proof of authentication output to the first user device;
validating, via the at least one authentication service, the cryptographic information received from the second user device against the proof of authentication output by the at least one authentication service to the first user device; and
granting, via the at least one authentication service to the second user device, access to the protected resource in response to validating the cryptographic information received from the second user device against the proof of authentication output by the at least one authentication service to the first user device;
wherein the method is performed by at least one processing device comprising a processor coupled to a memory.

2. The computer-implemented method of claim 1, further comprising:
storing the proof of authentication.

3. The computer-implemented method of claim 1, wherein the proof of authentication comprises a quick response code.

4. The computer-implemented method of claim 1, wherein the proof of authentication comprises one or more temporal parameters.

5. The computer-implemented method of claim 4, wherein the one or more temporal parameters define a duration of time during which the proof of authentication remains valid.

6. The computer-implemented method of claim 1, wherein the proof of authentication comprises a set of alphanumeric data.

7. The computer-implemented method of claim 1, wherein the proof of authentication comprises a set of image data.

8. The computer-implemented method of claim 1, wherein the proof of authentication comprises a set of audio data.

9. The computer-implemented method of claim 1, wherein the proof of authentication comprises a set of video data.

10. The computer-implemented method of claim 1, further comprising:
prompting, in response to receiving the request to access the protected resource from the second user device, the second user device to retrieve the proof of authentication from the first user device.

11. The computer-implemented method of claim 1, further comprising:
creating, in response to validating the authentication result received via the first user device, an authentication session for the user.

12. The computer-implemented method of claim 11, wherein the proof of authentication comprises information pertaining to the authentication session.

13. The computer-implemented method of claim 1, wherein the first user device comprises one of a desktop computer, a laptop computer, a tablet, and a mobile device.

14. The computer-implemented method of claim 1, wherein the second user device comprises one of a desktop computer, a laptop computer, a tablet, and a mobile device.

15. A non-transitory processor-readable storage medium having stored therein program code of one or more software programs, wherein the program code when executed by at least one processing device causes the at least one processing device:
to validate, via at least one authentication service connected to a first user device via network connectivity, an authentication result received via the first user device;
to generate, via the at least one authentication service in response to validating the authentication result, a proof of authentication that relates to the authentication performed via the first user device;
to output, via the at least one authentication service, the proof of authentication to the first user device via the network connectivity;
to output, via the at least one authentication service to a second user device via network connectivity, a request for cryptographic information in response to a request to access a protected resource by the second user device;
to obtain, via the second user device from the first user device, wherein the first user device lacks network connectivity, at least a portion of the proof of authentication;
to receive, via the at least one authentication service from the second user device via network connectivity, cryptographic information comprising the at least a portion of the proof of authentication output to the first user device;
to validate, via the at least one authentication service, the cryptographic information received from the second user device against the proof of authentication output by the at least one authentication service to the first user device; and
to grant, via the at least one authentication service to the second user device, access to the protected resource in response to validating the cryptographic information received from the second user device against the proof of authentication output by the at least one authentication service to the first user device.

16. The non-transitory processor-readable storage medium of claim 15, wherein the proof of authentication comprises one or more temporal parameters.

17. The non-transitory processor-readable storage medium of claim 15, wherein the program code when executed by the at least one processing device causes the at least one processing device:
to prompt, in response to receiving the request to access the protected resource from the second user device, the second user device to retrieve the proof of authentication from the first user device.

18. An apparatus comprising:
at least one processing device comprising a processor coupled to a memory;
the at least one processing device being configured:
to validate, via at least one authentication service connected to a first user device via network connectivity, an authentication result received via the first user device;
to generate, via the at least one authentication service in response to validating the authentication result, a proof of authentication that relates to the authentication performed via the first user device;
to output, via the at least one authentication service, the proof of authentication to the first user device via the network connectivity;
to output, via the at least one authentication service to a second user device via network connectivity, a request for cryptographic information in response to a request to access a protected resource by the second user device;
to obtain, via the second user device from the first user device, wherein the first user device lacks network connectivity, at least a portion of the proof of authentication;
to receive, via the at least one authentication service from the second user device via network connectivity, cryptographic information comprising the at least a portion of the proof of authentication output to the first user device;
to validate, via the at least one authentication service, the cryptographic information received from the second user device against the proof of authentication output by the at least one authentication service to the first user device; and
to grant, via the at least one authentication service to the second user device, access to the protected resource in response to validating the cryptographic information received from the second user device against the proof of authentication output by the at least one authentication service to the first user device.

19. The apparatus of claim 18, wherein the proof of authentication comprises one or more temporal parameters.

20. The apparatus of claim 18, wherein the at least one processing device being further configured:

to prompt, in response to receiving the request to access the protected resource from the second user device, the second user device to retrieve the proof of authentication from the first user device.

\* \* \* \* \*